US012660868B2

(12) United States Patent
Rowbottom

(10) Patent No.: US 12,660,868 B2
(45) Date of Patent: Jun. 23, 2026

(54) COMBINED PHOSPHORESCENT, RETROREFLECTIVE AND FLUORESCENT ARTICLE

(71) Applicant: Coats Trading (UK) Limited, London (GB)

(72) Inventor: Nicholas James Rowbottom, Crewe (GB)

(73) Assignee: Coats Trading (UK) Limited, London (GB)

( * ) Notice: Subject to any disclaimer, the term of this patent is extended or adjusted under 35 U.S.C. 154(b) by 730 days.

(21) Appl. No.: 17/909,723

(22) PCT Filed: Mar. 5, 2021

(86) PCT No.: PCT/GB2021/050553
§ 371 (c)(1),
(2) Date: Sep. 6, 2022

(87) PCT Pub. No.: WO2021/176229
PCT Pub. Date: Sep. 10, 2021

(65) Prior Publication Data
US 2023/0210200 A1     Jul. 6, 2023

(30) Foreign Application Priority Data

Mar. 5, 2020     (GB) ..................................... 2003231

(51) Int. Cl.
A41D 13/01     (2006.01)
A41D 31/32     (2019.01)
G02B 5/12     (2006.01)
(52) U.S. Cl.
CPC ............. A41D 13/01 (2013.01); A41D 31/32 (2019.02); G02B 5/12 (2013.01)

(58) Field of Classification Search
CPC .......... A41D 13/01; A41D 31/32; G02B 5/12; B32B 3/26; B32B 3/266; B32B 2307/416; B32B 2307/422
See application file for complete search history.

(56) References Cited

U.S. PATENT DOCUMENTS 6,569,786 B1 *     5/2003     Marsh ..................... B32B 27/12
428/920
2003/0100637 A1     5/2003     Mimura
(Continued)

FOREIGN PATENT DOCUMENTS

CN     102138087 A     7/2011
EP     1082274     11/1999
(Continued)

OTHER PUBLICATIONS

Patent Cooperation Treaty: International Search Report and Written Opinion for PCT Application No. PCT/GB2021/050553, dated May 25, 2021, 10 pages.

*Primary Examiner* — Charles S Chang
(74) *Attorney, Agent, or Firm* — Schwabe, Williamson & Wyatt, P.C.

(57)     ABSTRACT

The present invention relates to a combined phosphorescent, retroreflective and fluorescent article comprising a substrate, a phosphorescent layer on at least one side of the substrate and a retroreflective and fluorescent sheet provided over the phosphorescent layer, wherein the retroreflective and fluorescent sheet is configured so that at least 5% of visible area of said one side is phosphorescent.

20 Claims, 10 Drawing Sheets

(56) References Cited

U.S. PATENT DOCUMENTS

| | | | | |
|---|---|---|---|---|
| 2010/0269242 | A1* | 10/2010 | Stubiger | D06N 7/0092 |
| | | | | 428/196 |
| 2014/0022641 | A1* | 1/2014 | Yoon | G02B 5/128 |
| | | | | 359/538 |
| 2017/0205545 | A1* | 7/2017 | Rowbottom | A41D 13/01 |

FOREIGN PATENT DOCUMENTS

| | | | |
|---|---|---|---|
| JP | S60205501 | A | 10/1985 |
| JP | H06160615 | A | 11/1992 |
| RU | 2007113042 | A | 10/2008 |

* cited by examiner

COMBINED PHOSPHORESCENT, RETROREFLECTIVE AND FLUORESCENT ARTICLE

CROSS-REFERENCE TO RELATED APPLICATION

The present application is a national phase entry under 35 U.S.C. § 371 of International Application No. PCT/GB2021/050553, filed Mar. 5, 2021, which designates the United States of America, which claims priority to GB Application No. 2003231.4, filed Mar. 5, 2020, the entire disclosures of each of these applications are hereby incorporated by reference in their entireties and for all purposes.

TECHNICAL FIELD OF THE INVENTION

The present invention relates to a combined phosphorescent, retroreflective and fluorescent article, to a method of making a combined phosphorescent, retroreflective and fluorescent article and to a garment comprising a combined phosphorescent, retroreflective and fluorescent article.

BACKGROUND TO THE INVENTION

High visibility clothing comprises warning clothing intended to provide improved conspicuity in situations where the risk of not being seen is high. Such clothing, which typically comprises vests, waistcoats, jackets, and over-trousers, is designed to provide three classes of high visibility based on three different minimum areas of retroreflective, fluorescent and/or combined performance materials. The standards for each of these classes are such that the garment, headwear or footwear has to provide a predefined level of conspicuity against most backgrounds found in urban and rural situations in daylight and in night time. Conspicuity is determined by an object's luminance contrast, colour contrast, pattern and design, and motion characteristics relative to the ambient background against which it is seen. In a combined performance garment, appropriate areas thereof have to provide the specified level of retroreflection and fluorescence, which is usually supplied by retroreflective and fluorescent tapes that are sewn or otherwise secured to the garment.

Retroreflective materials are those that reflect light back to its source with a minimum of scattering. Typically, they comprise retroreflective glass beads, microprisms, or encapsulated lenses that are sealed onto a fabric or plastic substrate, for example as described in WO94/25666. Fluorescent materials on the other hand emit electromagnetic radiation at visible wavelengths longer than those absorbed. In high visibility clothing the fluorescent materials rapidly emit visible light after absorption of photons (after photoexcitation).

Firefighter garments present special problems to a wearer. Unlike other types of garments, firefighter garments are to be worn in extremely hazardous and abrasive environments, and must be designed to withstand temperatures in excess of 180° C. without significant degradation. It is known to secure a combined retroreflective and fluorescent trim material to the outer shell of a firefighter garment such as a jacket in order to improve the visibility of the firefighter when inside and outside of a burning building. However, such combined retroreflective and fluorescent trim materials suffer from the disadvantage that the retroreflective materials only reflect light when exposed to an external light source, e.g. a torch. Without an external light source or if an external light source is unable to reach the retroreflective material; e.g. due to the generation of thick smoke in a burning building, the retroreflective material will not enhance visibility of a firefighter wearing the garment in a dark or smoke-filled environment. Similarly, fluorescent materials are only able to increase the visibility of a person wearing the garment when they are directly exposed to a light source, and once exposure to the light source ceases or becomes impaired, fluorescence then stops. Therefore, the visibility of a firefighter in a dark or smoke-filled environment is dependent upon whether a light source is able to reach the retroreflective and fluorescent materials of the combined retroreflective and fluorescent trim material secured to the outer shell of the garment.

In view of the drawbacks associated with conventional combined retroreflective and fluorescent trim materials, there is a need, particularly with respect to firefighter garments, for such garments to be visible irrespective of whether a light source is able to reach the garment when the garment is being worn by a firefighter in use.

SUMMARY OF THE INVENTION

According to a first aspect of the invention there is provided a combined phosphorescent, retroreflective and fluorescent article comprising a substrate, a phosphorescent layer on at least one side of the substrate and a retroreflective and fluorescent sheet provided over the phosphorescent layer, wherein the retroreflective and fluorescent sheet is configured so that at least 5% of visible area of said one side is phosphorescent.

The inventors have found that the above drawbacks are overcome by providing an article that comprises phosphorescent, retroreflective and fluorescent regions. In this respect the retroreflective and fluorescent regions function in their normal way and increase the visibility of the article upon exposure to an external light source. However, the combined phosphorescent, retroreflective and fluorescent article provides enhanced visibility over conventional retroreflective and fluorescent trim materials since the phosphorescent layer remains visible over an extended period of time irrespective of whether it is being directly exposed to a visible light source, in use. Accordingly, when the combined phosphorescent, retroreflective and fluorescent article is secured to a garment such as a firefighter's jacket, over trousers, head wear or footwear, the conspicuity of the person wearing one or more of the garments is increased relative to a person wearing a garment comprising the conventional combined retroreflective and fluorescent trim material.

The phosphorescent layer may comprise a mixture of an adhesive and phosphorescent pigment. The mixture may comprise between 20% and 70% inclusive of a phosphorescent pigment comprised of particles having a size of up to 150 μm. In some embodiments the mixture may comprise 50% of a phosphorescent pigment having a particle size between 20 μm and 60 μm inclusive. Such a size gives a good packing density of the particles of pigment to ensure that the phosphorescence is even across the area of the substrate.

The phosphorescent pigment may comprise at least one of an aluminate based phosphorescent pigment, a sulphide based phosphorescent pigment, a silicate based phosphorescent pigment or mixtures thereof. In particular, the aluminate based phosphorescent pigment may comprise strontium aluminate. Such pigments are known that emit visible light for up to several hours after exposure to daylight. The phosphorescent pigment may be doped in order to enhance its phosphorescent performance.

The adhesive may be a transparent adhesive so that the phosphorescence of the finished material is not impaired. Adhesives comprising resins such as vinyl, acrylic, urethane, epoxy, polyester and alkyd resins are all suitable and may be are formulated into a printable liquid at a viscosity and rheology applicable to the coating process being used. The adhesive may be a heat or UV-curable adhesive which can be re-melted after curing.

The phosphorescent layer may have a coating weight of between 200 g/m² and 750 g/m². The phosphorescent layer may have a coating weight of 275 to 325 g/m² and comprise at least 50% of phosphorescent pigments with a particle size of between 20 μm and 60 μm inclusive. In particular, the phosphorescent layer may have a coating weight of 300 g/m². The phosphorescent layer may comprise a plurality of phosphorescent sub-layers. It has been found that phosphorescent layers formed from multiple phosphorescent sub-layers allows improvements in glow performance to be obtained.

The coated substrate may comprise a top coat. The top coat acts as a barrier or seal which increases the wash performance and durability of the article. The top coat is preferably transparent so that it does not reduce the glow performance of the phosphorescent layer. The top coat may comprise polyurethane.

The retroreflective and fluorescent sheet may comprise a plurality of openings for exposing the underlying phosphorescent layer. In particular, the retroreflective and fluorescent sheet may comprise an open area (formed by the line openings) of 15-38% per cm² which allows the article to meet the requirements of EN ISO 20471:2013.

In some embodiments the openings may be in the form of lines which partially extend across the width of the retroreflective and fluorescent sheet. The line openings may extend from one longitudinal edge of the retroreflective and fluorescent sheet and terminate before reaching the opposite longitudinal edge of the retroreflective and fluorescent sheet, i.e. the line opening does not intersect the opposing longitudinal edge to form a discontinuity in said longitudinal edge. The line openings may comprise straight line openings and/or L-shaped line openings. These line openings may extend in a direction substantially perpendicular to the longitudinal axis of the retroreflective and fluorescent sheet. Alternatively, the line openings may be in the form of a chevron.

In some embodiments one or more of the line openings may extend substantially parallel to the longitudinal edges of the retroreflective and fluorescent sheet In some embodiments, the line openings may extend partly along and substantially parallel to one or both of the longitudinal edges of the retroreflective sheet.

In some embodiments, the line openings may extend fully along and substantially parallel to and one or both of the longitudinal edges of the retroreflective sheet.

In some embodiments the line openings may extend along and adjacent to one or both of the longitudinal edges of the retroreflective and fluorescent sheet.

In some embodiments the line openings may extend substantially parallel to the longitudinal edges in a fluorescent region of the retroreflective and fluorescent sheet. In particular, the line openings may be located in a central area of the fluorescent region.

In some embodiments the line openings may extend substantially parallel to the longitudinal edges in a retroreflective region of the retroreflective and fluorescent sheet.

In some embodiments the line openings may extend substantially parallel to the longitudinal edges and be provided at a boundary between the retroreflective region and the fluorescent region of the retroreflective and fluorescent sheet.

In some embodiments the retroreflective region may comprise a line opening which extends perpendicular to the longitudinal axis of the retroreflective and fluorescent sheet. This line opening may be joined at either end with angled line openings which extend from the retroreflective region into the fluorescent region or regions.

In some embodiments the retroreflective and fluorescent sheet may comprise line openings which are angled with respect to one another. The lines openings may be connected and angled with respect to one another. For example, the line openings may be arranged to define a substantially octagon-like shape. In some embodiments, the retroreflective region may comprise a plurality of octagon-like shapes. These octagon-like shapes may be joined together or alternatively they may be spaced apart along the retroreflective region.

In some embodiments the openings may be in the form of lines which extend across the full width of the retroreflective and fluorescent sheet.

The lines openings may have a width of 0.2 mm to 1.5 mm. In particular, the line openings may have a width of 0.8 mm to 1.2 mm.

The line openings may be spaced 1 mm to 15 mm apart. In particular, the line openings may be spaced 6 mm to 10 mm apart.

The line openings may extend across the retroreflective and fluorescent sheet at an angle between 0 and 180 degrees to the horizontal. In particular, the retroreflective and fluorescent sheet may comprise one or more line openings oriented at an angle of 0-10 degrees, 10-20 degrees, 30-40 degrees, 40-50 degrees, 50-60 degrees, 60-70 degrees, 70-80 degrees or 80-90 degrees relative to the horizontal.

The phosphorescent layer may be visible along one longitudinal edge of the retroreflective and fluorescent sheet to define a phosphorescent border. In another embodiment, the phosphorescent layer may be visible along each longitudinal edge of the of the retroreflective and fluorescent sheet to define two phosphorescent borders. The or each border may have a width between 1 and 10 mm. Suitably, the width of the or each border may be 1 to 5 mm.

In some embodiments the retroreflective and fluorescent sheet may have a thickness of 10 to 35 μm. In particular, the thickness of the retroreflective and fluorescent sheet may be 15 to 25 μm. It has been found that when the retroreflective and fluorescent sheet has a thickness below 10 μm that the underlying phosphorescent layer is more susceptible to abrasion and degradation which could reduce the service life of the of the article. On the other hand, if the retroreflective and fluorescent sheet is too thick, e.g., above 35 μm, then this can lead to a reduction in phosphorescent performance and increased charging times. In one embodiment, the thickness of the retroreflective and fluorescent sheet may be about 20 μm.

The retroreflective and fluorescent sheet may comprise a central retroreflective region and fluorescent regions on either side of the central retroreflective region.

In some embodiments the substrate may comprise a fabric. The fabric may comprise aramid fibres. When the fabric comprises aramid fibres or if an aramid fabric is used, improved washing performance is obtained because the open weave of the fabric allows the phosphorescent pigment/adhesive mixture to penetrate deeper into the fabric. Washing performance in this context means that the glow performance of the coated substrate does not substantially diminish after 25 washing cycles.

Alternatively, the substrate may comprise woven cotton. In some embodiments the substrate may comprise a non-woven sheet material, for example a non-woven fabric or a plastics sheet.

The phosphorescent layer typically exhibits a green glow. However, it has been found that in some embodiments the use of a brightly coloured substrate enables the colour of the phosphorescent glow to be changed or enhanced without any need to add a coloured pigment to the phosphorescent layer, which could impair performance.

The phosphorescent layer may be provided in stripes and the retroreflective and fluorescent sheet is provided between the phosphorescent stripes. The stripes may be between 5 mm and 75 mm inclusive wide and between 5 mm and 75 mm inclusive apart. The retroreflective and fluorescent sheet may be secured to the substrate in strips in the gaps between the phosphorescent stripes. This means that the phosphorescent pigment is not wasted by being located behind the retroreflective sheet in use.

In an alternative embodiment, the substrate may be completely covered by the phosphorescent layer and the retroreflective and fluorescent sheet may be secured in predetermined positions over the top of phosphorescent layer.

The article may be provided in the form of a tape. Prior to securement of the retroreflective and fluorescent sheet, the substrate comprising the phosphorescent layer may be cut up to produce strips. Strips of the retroreflective and fluorescent sheet may then be applied and secured to the strips of substrate comprising the phosphorescent layer to produce sheet material in the form of a tape. The tape may include a transfer tape.

The retroreflective and fluorescent sheet is applied to the substrate comprising the phosphorescent layer in strips that are at least 20 mm wide. The strips may be 25 mm (1 inch), 35 mm or 50.08 mm (2 inches) 75 mm (3 inches) wide as these widths satisfy most international standards for use of the finished material as a tape for use on Fire Fighter.

In some embodiments the width of the substrate comprising the phosphorescent layer may be increased to create a photoluminescent border once the retroreflective and fluorescent sheet has been secured to substrate. The presence of a border facilitates alignment of the retroreflective and fluorescent sheet on the phosphorescent substrate thereby increasing the speed of production. The or each border may be 1-10 mm wide. Suitably, the or each border may be 1-5 mm. As an example, a 75 mm wide phosphorescent substrate may be increased to 77 mm so that there is a 1 mm photoluminescent border along each edge when a retroreflective and fluorescent sheet having a width of 75 mm is secured between the stripes. In another example, a 50 mm wide phosphorescent substrate may be increased to 55 mm in order to create a 2 mm photoluminescent border along each edge of an applied retroreflective and fluorescent sheet having a width of 50.08 mm. Suitably, the width of the phosphorescent substrate may be 50-65 mm or 75-85 mm depending on the width of the retroreflective and fluorescent sheet that is to be secured to the phosphorescent substrate.

The article may have a luminescence of 690 to 2200 (mcd/m2) after a decay time of two minutes according to ISO 17398:2004. Suitably, the luminescence may be from 1100 to 2200 or from 1750 to 2200 mcd/m2.

The decay time according to DIN 67510-1:2009 may be more than 24 hours. Suitably the decay time may be greater than 36 hours. For example, the decay time may be between 36 and 48 hours.

According to a second aspect of the invention there is provided a method of manufacturing a combined phosphorescent, retroreflective and fluorescent article, the method comprising the steps of:

I. coating at least part of one side of a substrate with a mixture of an adhesive and a phosphorescent pigment;
II. curing the coating; and
III. applying retroreflective and fluorescent materials over the phosphorescent layer, wherein at least 5% of visible area of said one side is phosphorescent.

The method according to the second aspect of the invention may be used to produce the combined phosphorescent, retroreflective and fluorescent article according to the first aspect of the invention. Accordingly, the method according to the second aspect of the invention may include any or all of the features described in relation to the first aspect of the invention.

A retroreflective and fluorescent sheet may be applied over the phosphorescent layer. In some embodiments the retroreflective and fluorescent sheet may be provided in the form of a tape of transfer film which is applied over the phosphorescent layer.

Retroreflective and fluorescent sheets in the form or rolls or tapes in the form of a transfer film are known. These may be applied directly to the coated substrate and secured thereto by an adhesive. The adhesive may be a heat-activatable adhesive or a pressure-sensitive adhesive. Conventional, commercially available products of this type comprise tapes with retroreflective regions and fluorescent regions that are removably disposed on a carrier film, for example in angled stripes across the width or part of the film. Such transfer films may be heat laminated to the coated substrate by heat press lamination methods and the carrier film thereafter removed to leave retroreflective and fluorescent regions secured to the substrate over the phosphorescent layer. Alternatively, retroreflective and fluorescent sheets in appropriate shapes or in roll or tape form may be secured by pressure-sensitive adhesive or by being sewn to the phosphorescent substrate.

A pre-determined pattern of openings may be formed in the retroreflective and fluorescent materials or in the retroreflective and fluorescent sheet for exposing the underlying phosphorescent layer. In some embodiments the predetermined pattern of openings may be formed in the retroreflective and fluorescent sheet prior to its application onto the coated substrate. In other embodiments the predetermined pattern of openings may be formed in the retroreflective and fluorescent sheet following its application onto the coated substrate. If the retroreflective and fluorescent materials are coated or otherwise applied onto the phosphorescent layer, i.e. not in the form of a retroreflective and fluorescent sheet, then the line pre-determined pattern of openings may be formed in the retroreflective and fluorescent materials following their deposition onto the coated substrate.

The pre-determined pattern of openings may be in the form of one or more lines that extend partially or fully across the width of a region covered by the retroreflective and fluorescent materials or the width of the retroreflective and fluorescent sheet.

The openings may be formed by laser cutting.

In some embodiments the method may comprise the steps of heat press laminating the transfer film to the coated substrate and removing a carrier film to leave the retrore-flective and fluorescent materials on the coated substrate. When the transfer film is being applied to the substrate it is important that the heat-sensitive adhesive used has an acti-vation temperature which is sufficient to adhere the transfer film to the substrate but does not also melt the transparent adhesive that is mixed with the phosphorescent pigment. Therefore, the mixture may include a catalyst that cross-links the adhesive when the mixture is cured so that it cannot be re-melted. Alternatively, or in addition, the heat-sensitive adhesive forming part of the transfer tape may have an activation temperature that is lower than that of the adhesive used in the mixture. For example, the former may be 120° c. and the latter 160° C.

The method may comprise the step of securing the article to a garment. The article may be secured to the garment by sewing. However, it is possible to produce an article that is a transfer, for example in the form of a transfer tape, so that it may be adhered to another item. This is achieved by coating the other side of the sheet of substrate with a pressure-sensitive adhesive that is then covered by a release material, which is peeled off when it is desired to adhere the sheet material to an item.

According to a third aspect of the invention there is provided a garment comprising the article according to the first aspect of the invention or the article obtained from the method according to the second aspect of the invention.

The garment according to the third aspect of the invention comprises the combined phosphorescent, retroreflective and fluorescent article according to the first aspect of the inven-tion or the article obtained from the method according to the second aspect of the invention. Accordingly, the garment according to the third aspect of the invention may include any or all of the features described in relation to the first aspect of the invention and/or the second aspect of the invention.

The garment may be a firefighter turnout garment. In particular, the firefighter turnout garment may comprise a jacket, over-trousers, gloves, headwear or foot wear.

According to a fourth aspect of the invention there is provided an object comprising the combined phosphores-cent, retroreflective and fluorescent article according to the first aspect of the invention or the article obtained from the method according to the second aspect of the invention. Accordingly, the object according to the third aspect of the invention may include any or all of the features described in relation to the first aspect of the invention and/or the second aspect of the invention.

The object may comprise signage, cones, stairways or, fire extinguishers.

DETAILED DESCRIPTION OF THE INVENTION

In order that the invention may be more clearly under-stood one or more embodiments thereof will now be described, by way of example only, with reference to the accompanying drawings, of which:

Figure 1:
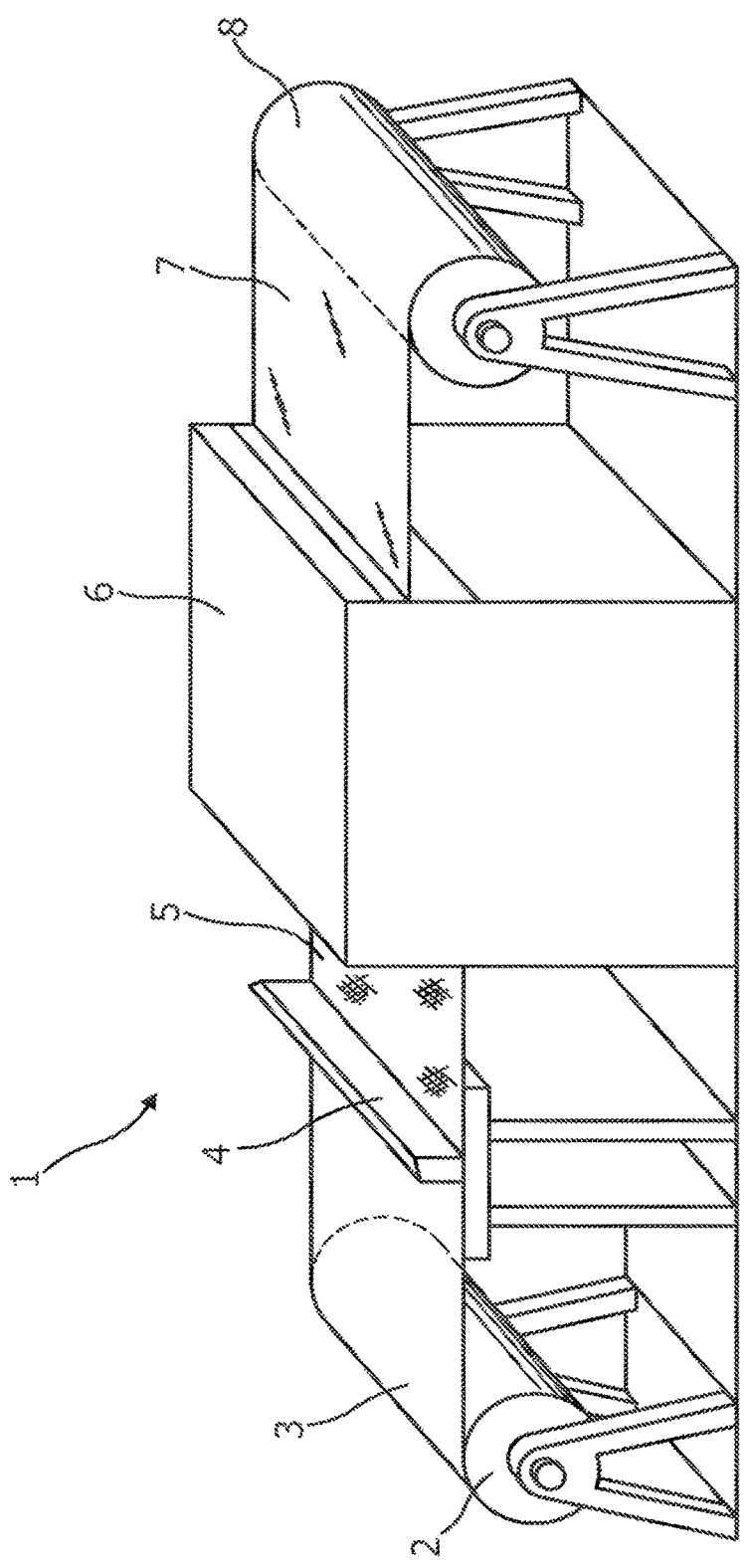
FIG. 1 is a schematic perspective view of apparatus for use in a first part of a manufacturing process to produce a combined phosphorescent, retroreflective and fluorescent sheet.

With reference to FIG. 1, a first part of a method for manufacturing a combined phosphorescent, retroreflective and fluorescent sheet material is shown that uses an air knife coating apparatus 1. Here, a roll of aramid fabric 2 is used to supply a sheet of a substrate 3 that is passed under an air knife 4 to be coated with a mixture of a transparent adhesive and a phosphorescent pigment. The mixture comprises a transparent acrylic adhesive and 50 wt % of strontium aluminate. The size of the strontium aluminate pigments is 20-60 microns. In this embodiment a polyurethane top coat (20 microns) is provided over the coated aramid fabric to enhance the wash performance and durability of the article. The air knife 4 is of conventional form wherein the coating is applied to the substrate 3 and spread to a predetermined thickness by the knife 4 which is set so that its edge is this predetermined distance above the substrate 3. This produces an even coating across the substrate 3. After passing under the air knife 4 the coated substrate 5 is fed into a curing oven 6. Dependent on the type of adhesive that forms part of the coating, the curing oven 6 either heats the coated substrate 5 to cure the coating or irradiates it with UV radiation. The coated substrate 7 emerging from the oven 6 is then fed onto a roll 8 to complete the first part of the manufacturing process in which a phosphorescent coating is applied to the substrate. As described below, in some embodiments, the phosphorescent coating may be applied in stripes along the length of the substrate 3. This may be accomplished using a slot die coating process.

Figure 2:
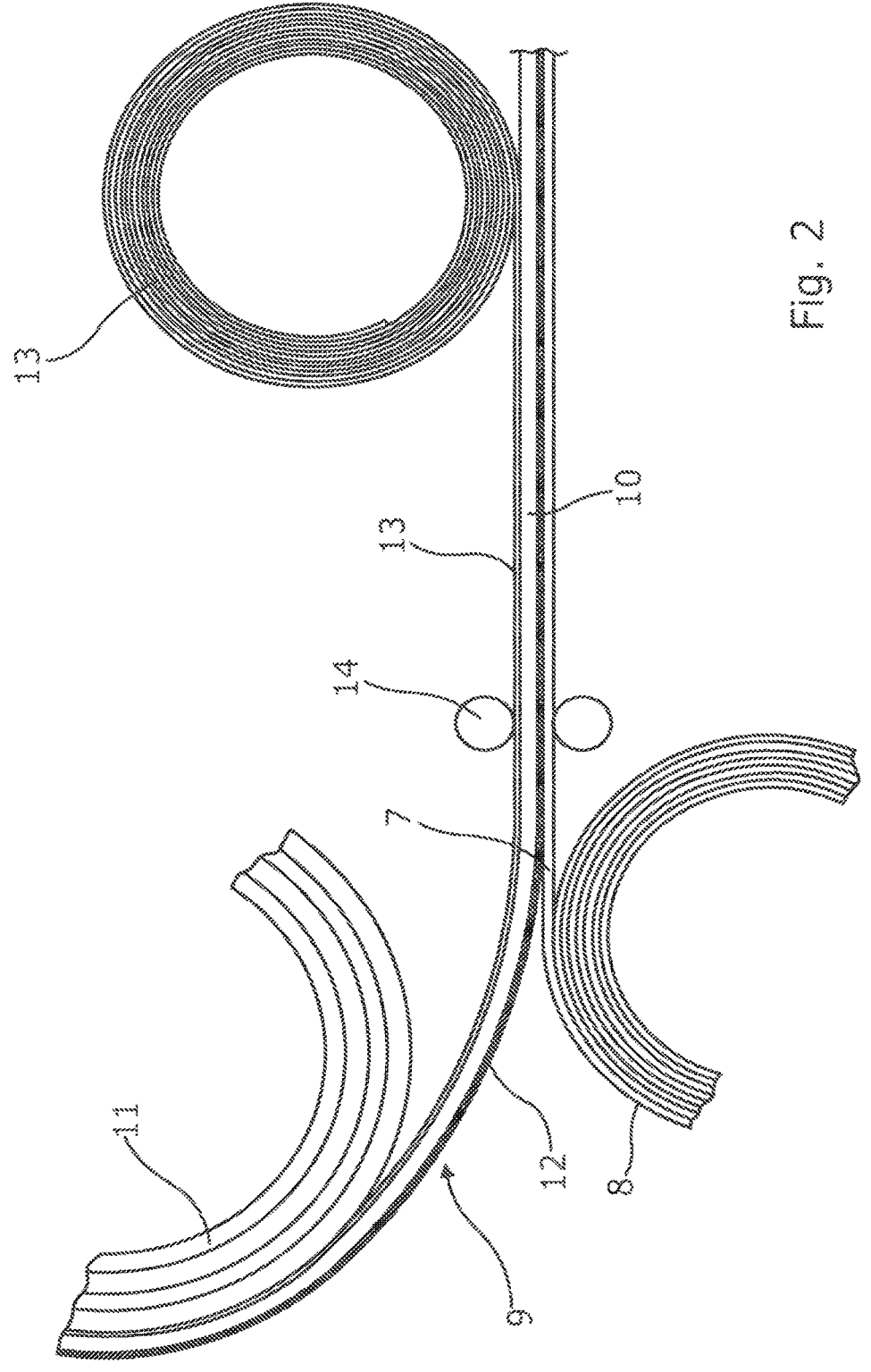
FIG. 2 is a schematic perspective view of apparatus for use in a second part of the manufacturing process, the dimensions of layers of the sheet material shown being exaggerated for clarity.

The next step in the manufacturing process is to apply a retroreflective and fluorescent material to the coated sub-strate. One method of accomplishing this is shown in FIG. 2. Here, a retroreflective and fluorescent sheet in the form of a tape 9 of transfer film to which a strip of retroreflective and fluorescent material 10 has been applied is fed from a roll 11 and applied to the coated side of the substrate 7 which is taken from a roll such as the roll 8, as described above. The tape 9 has an adhesive 12 pre-applied to its back surface, which is that facing the substrate 7, and has a carrier film 13 covering the retroreflective and fluorescent material 10. The adhesive 12 is pressure and/or heat sensitive. The substrate 11 and overlying tape 9 are then led between nip rollers 14, which may be heated. The nip rollers 14 activate the adhesive and cause the retroreflective and Fluorescent mate-rial 10 of the tape 9 to be adhered to the substrate 11.

Finally, the overlying carrier film 13 is removed to leave a phosphorescent, reflective and fluorescent sheet material which in turn can be applied to a garment or other object. If the phosphorescent coating has been applied to the substrate in stripes, then several tapes 9 of transfer film may be applied to the coated substrate 7 simultaneously across its width, typically in uncoated areas. In this case, after application of the retroreflective and fluorescent material, the finished material has to be cut into separate tapes. Alternatively, the coated substrate 7 may be cut into strips prior to application of the tape 9 of transfer film thereto so that each strip of substrate 7 is then individually overlaid by a tape 9.

Figures 3, 4, 4A:
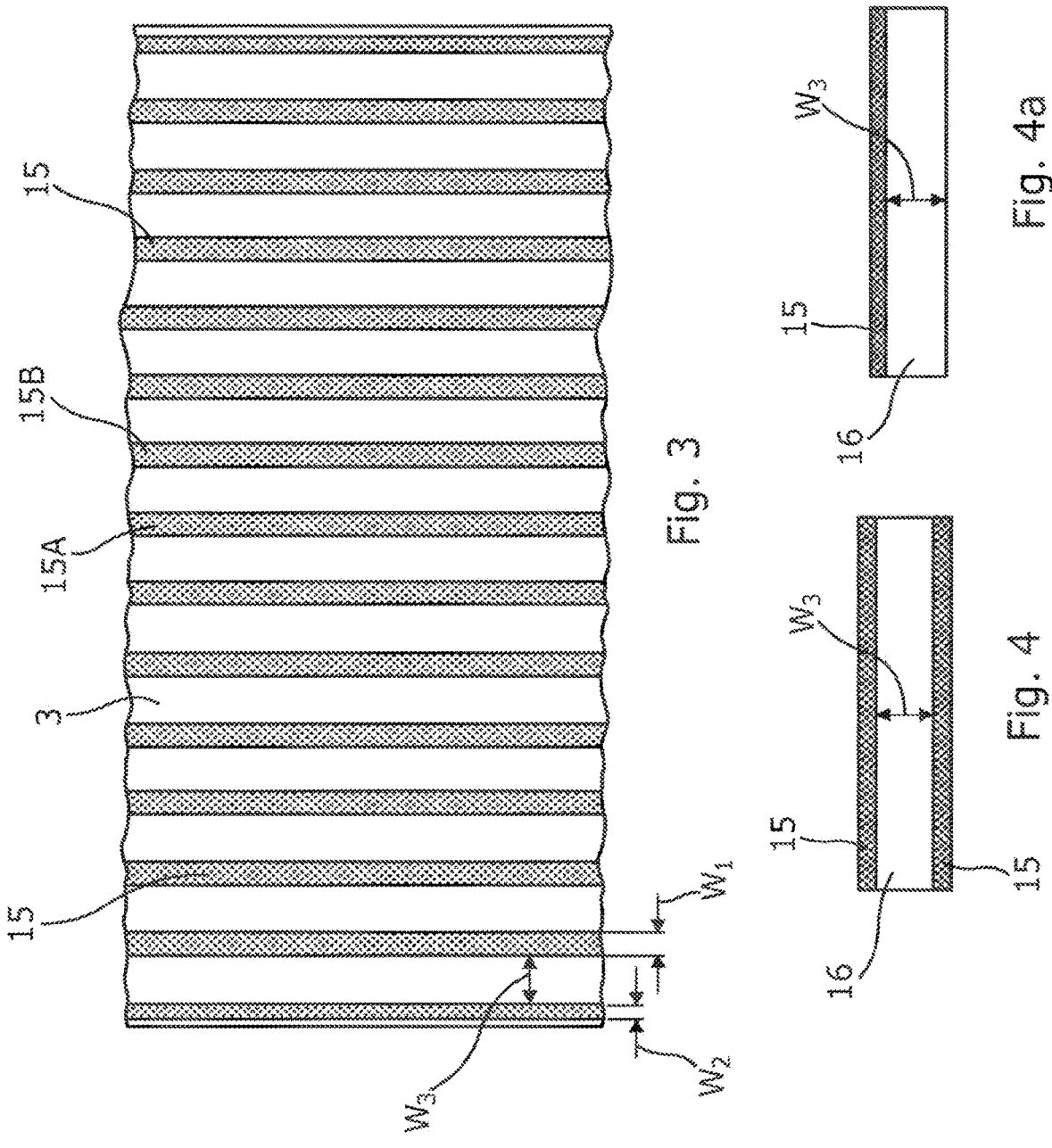
FIG. 3 is a diagram of one side of a substrate forming part of a sheet material showing a pre-determined pattern of phosphorescent layers on the substrate.
FIG. 4 is a diagram of one side of an embodiment of a combined phosphorescent, retroreflective and fluorescent in the form of a tape.
FIG. 4a is a diagram similar to FIG. 4, but of another embodiment of tape.

As described above, in the first process, the substrate 3 may be coated over the whole of one side with the phosphorescent pigment/adhesive mixture. Alternatively, if it is desired to produce finished material in tape form then the mixture may be applied to the substrate 3 in stripes as shown in FIG. 3. Here longitudinal stripes 15 of the mixture are applied across the width of the substrate 3. The stripes themselves can be of any desired width but to produce tapes suitable for use on fire fighter uniforms or high visibility clothing each stripe preferably has a width $W_1$ of at least 20 mm with the stripes 15 at each longitudinal edge of the substrate have a width $W_2$ half that of $W_1$, namely 10 mm in the present example. The distance $W_3$ between adjacent stripes 15A, 15B is preferably at least 20 mm wide but is most likely to be 25 mm (1 inch), 35 mm or 50.08 mm (2 inches) or 75 mm (3 inches) wide to meet most international standards for tapes used on firefighter uniforms or high visibility clothing as the width $W_3$ is identical to the width of the retroreflective and fluorescent sheet 17 that is to be applied to cover it. The width $W_3$ should be selected to satisfy the required standard for use of the finished material but it will be appreciated that the relative dimensions of the retroreflective and fluorescent sheet 16 and substrate 3, and in particular the widths $W_1$, $W_2$ and $W_3$, may be varied as required. Once coated, the substrate 3 may be cut into separate strips down the middle of the stripes 15 to produce tapes as shown in FIG. 4, for example that have a 10 mm wide stripe 15 of phosphorescent coating down each side and a 50.08 mm strip down the centre that is then covered by retroreflective and fluorescent material 16 as described above.

Figure 5:
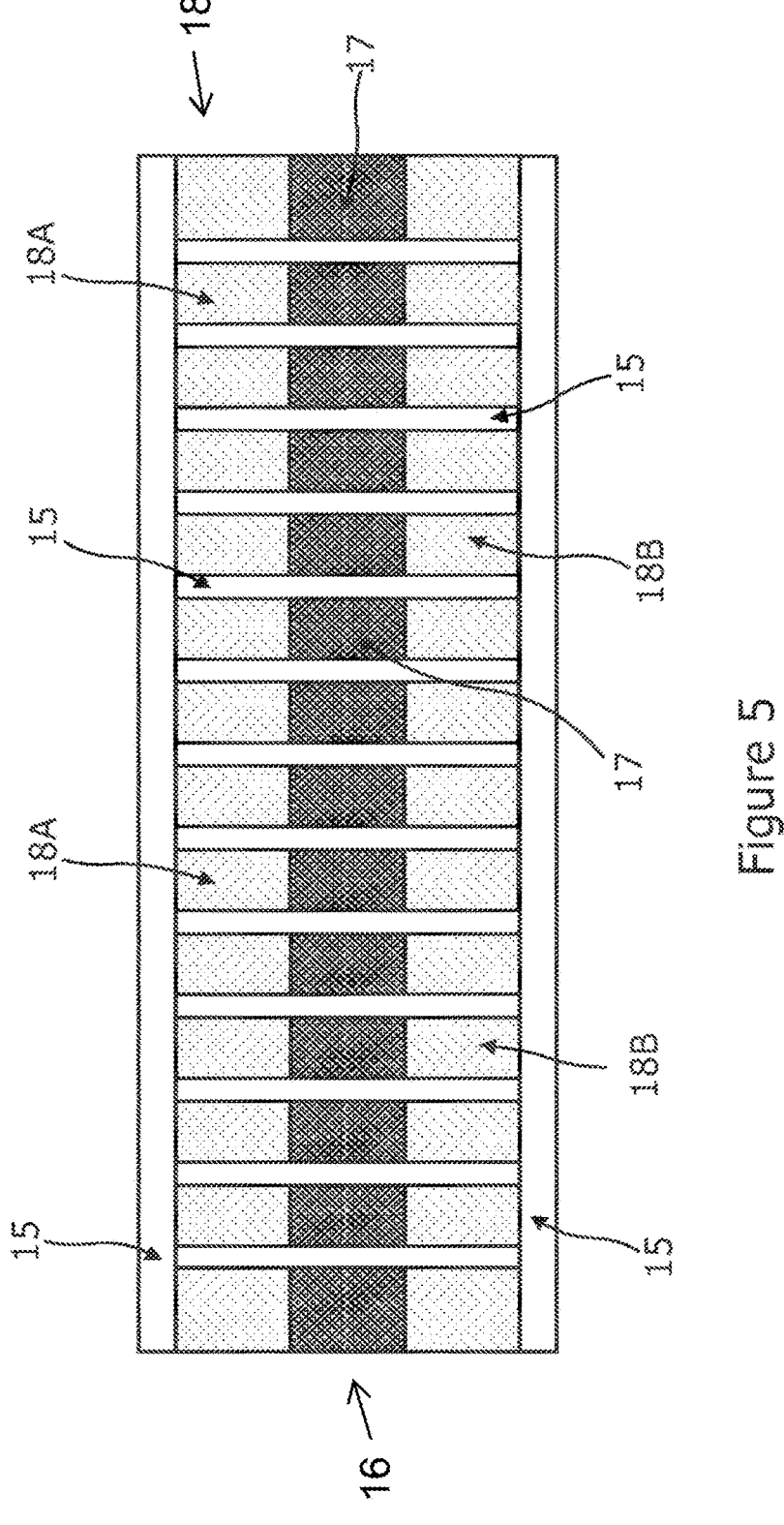
FIG. 5 is a diagram similar to FIG. 4 but of another embodiment of tape.

In an alternative arrangement as shown in FIG. 5, the substrate 3 is coated over the whole of one side with the phosphorescent pigment/adhesive mixture 15 and is still cut into strips that are, for example, 60.08 mm wide similar to those shown in FIG. 4. Here, a 50.08 mm strip of retroreflective and fluorescent sheet 16 is secured down the centre of each strip to leave 5 mm wide borders of the phosphorescent coating 15 down each side of the tape, as in FIG. 4. Alternatively, and as shown in FIG. 4a, a 50.08 mm strip of retroreflective and fluorescent sheet 16 is secured along one longitudinal edge of each strip to leave a 1-10 mm border of phosphorescent coating 15 down one side of the tape only. As shown in FIG. 5, the retroreflective and fluorescent regions are not continuous but comprise discontinuous retroreflective 17 and fluorescent regions 18 that are arranged across the width of the central area. In this embodiment the retroreflective 17 and fluorescent 18 regions are oriented perpendicular to the longitudinal axis of the substrate 3, but it will be appreciated that the retroreflective 17 and fluorescent 18 regions could be angled at 0-90 degrees.

As best shown in FIGS. 5 and 6a-6i, the retroreflective and fluorescent sheet comprises a central retroreflective region 17 and fluorescent regions 18A, 18B on either side of the central retroreflective region 17. In these embodiments the fluorescent regions 18 are yellow and the reflective region is silver to produce a yellow-silver-yellow design. However, it will be appreciated that one or both of the fluorescent yellow regions could be another colour, e.g., orange, green, blue or pink. As the underlying substrate comprises the phosphorescent coating 15, and is provided with discontinuous retroreflective 17 and fluorescent 18 regions, the phosphorescent coating 15 is visible through the openings between the retroreflective and fluorescent regions 17, 18.

Figures 6A, 6B, 6C, 6D:
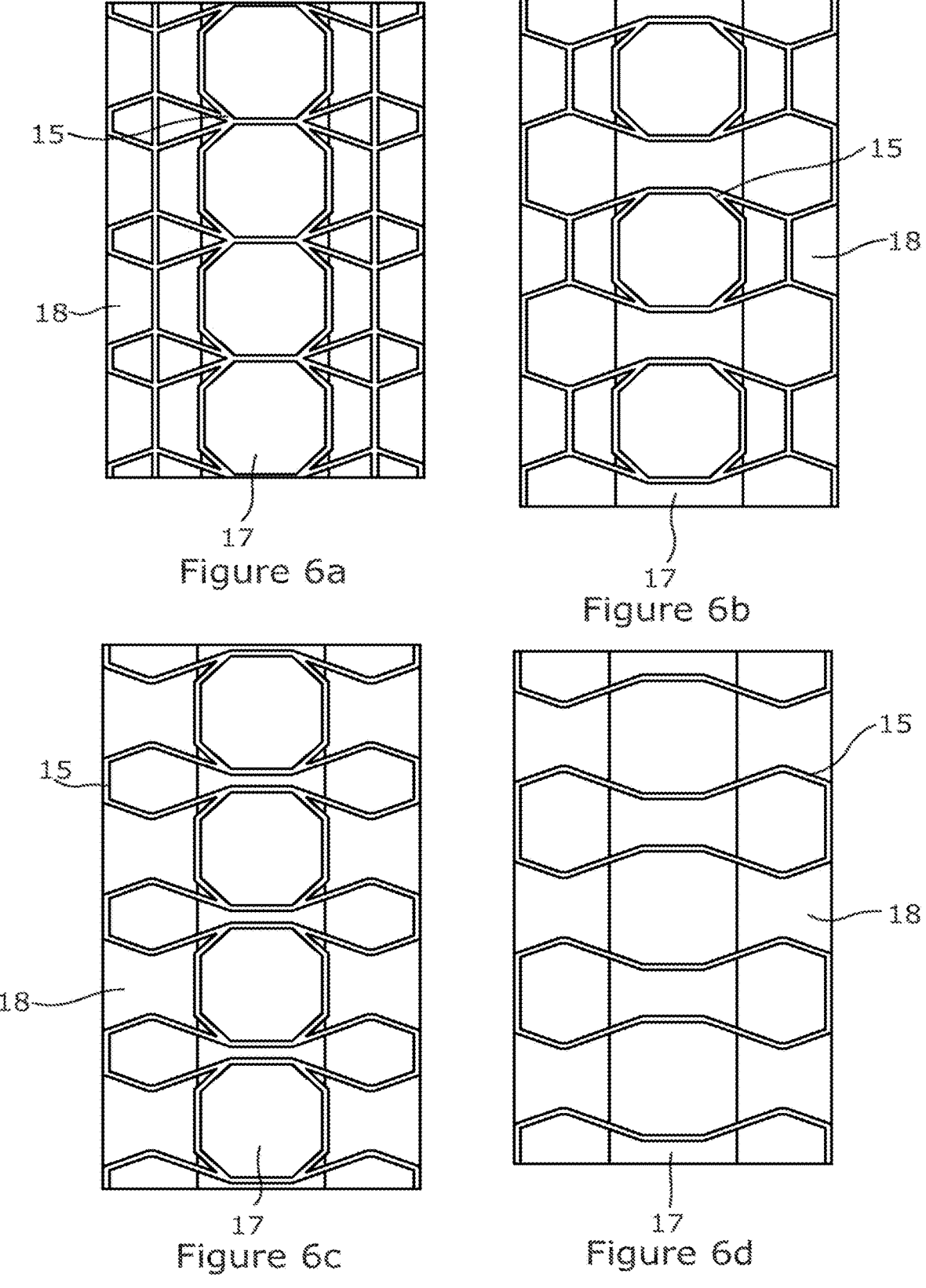
FIGS. 6a-6i are diagrams similar to FIG. 5 showing pre-determined patterns of line openings for exposing the phosphorescent layer.
Figures 6E, 6F:
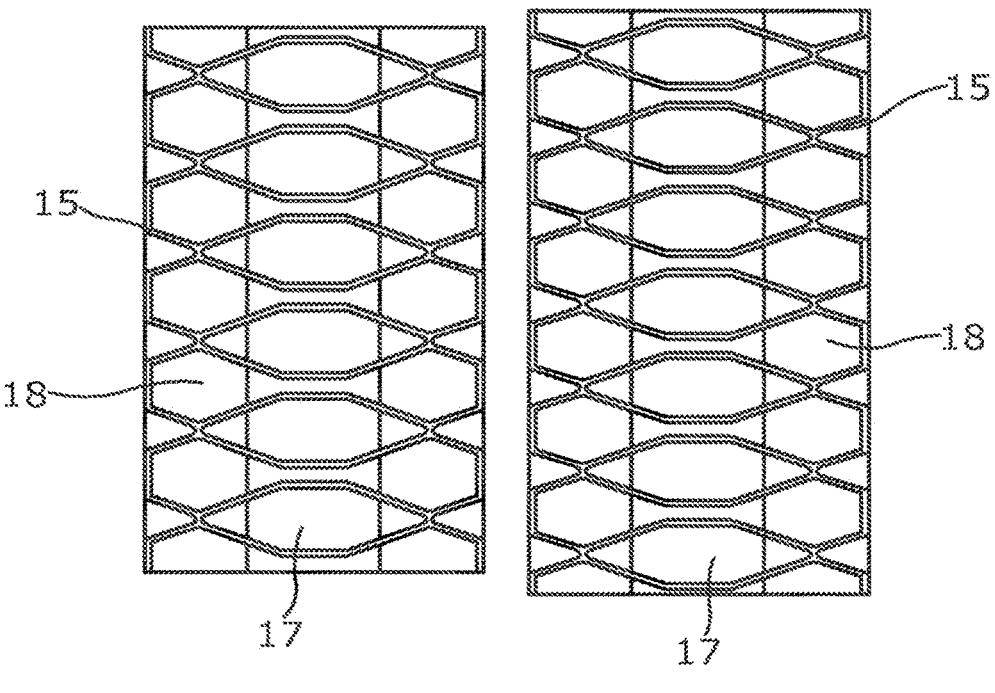
Figure 6G:
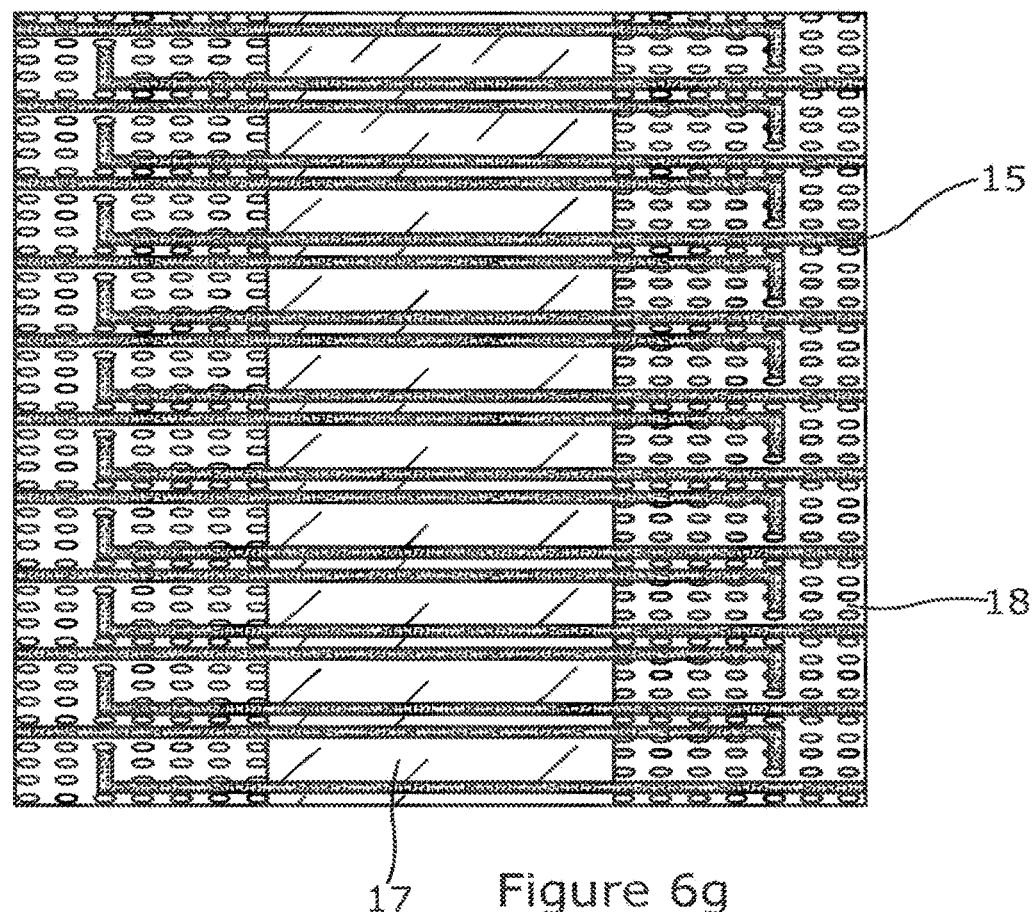
Figure 6H:
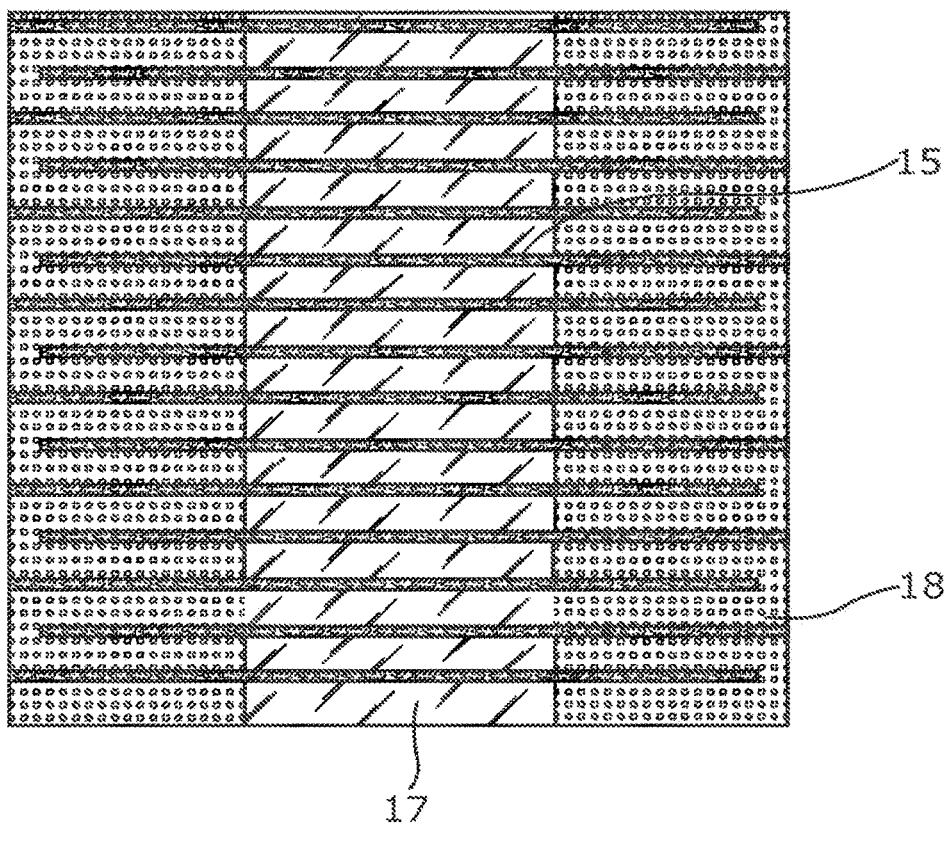
Figure 6I:
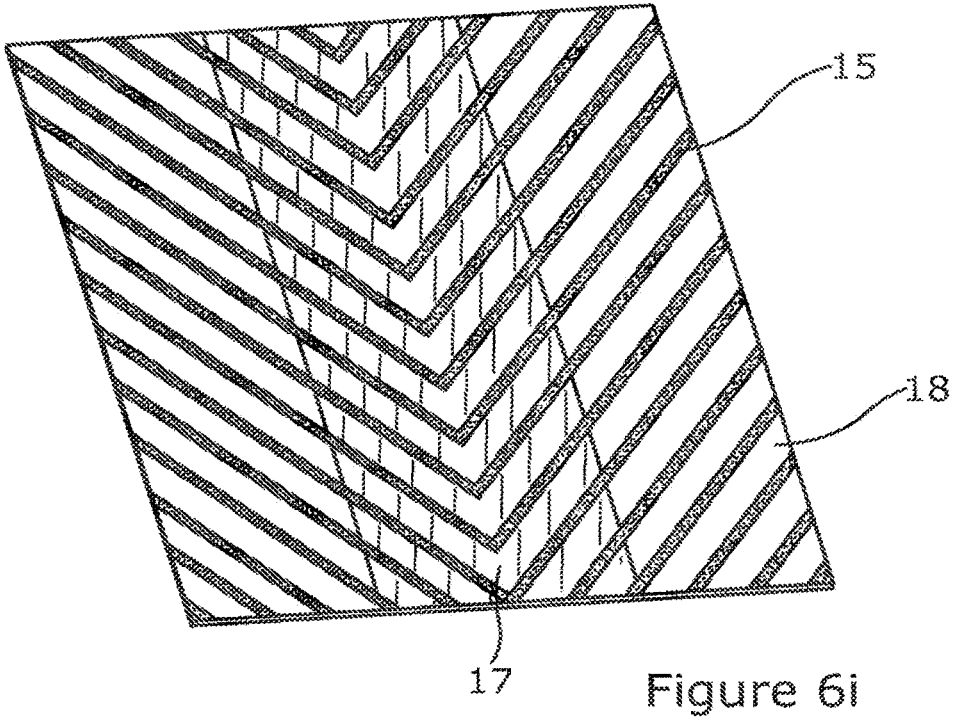
Figures 7A, 7B:
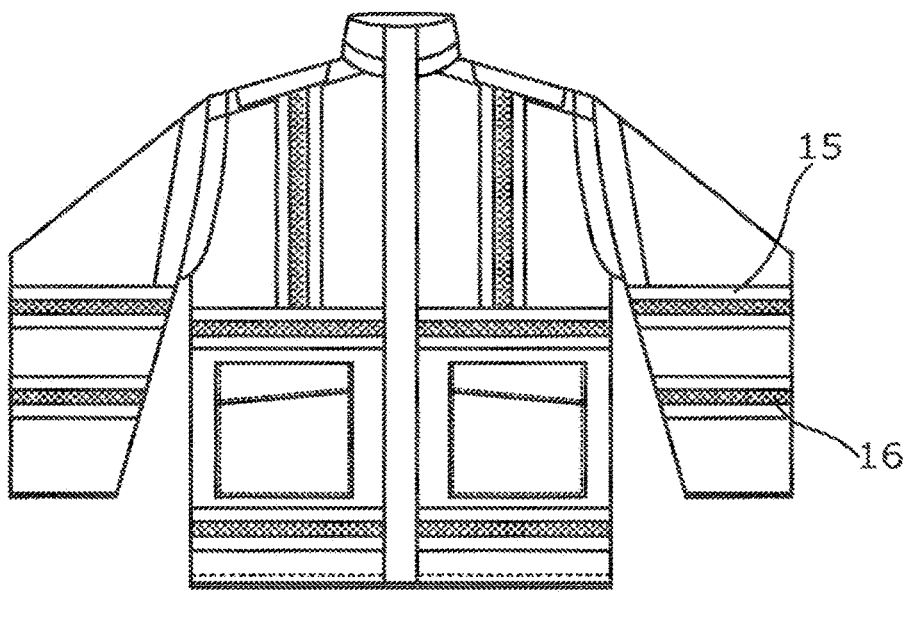
FIGS. 7a and 7b are front and rear views of a firefighter jacket including areas of tape as shown in FIG. 4 secured thereto.
Figure 7C:
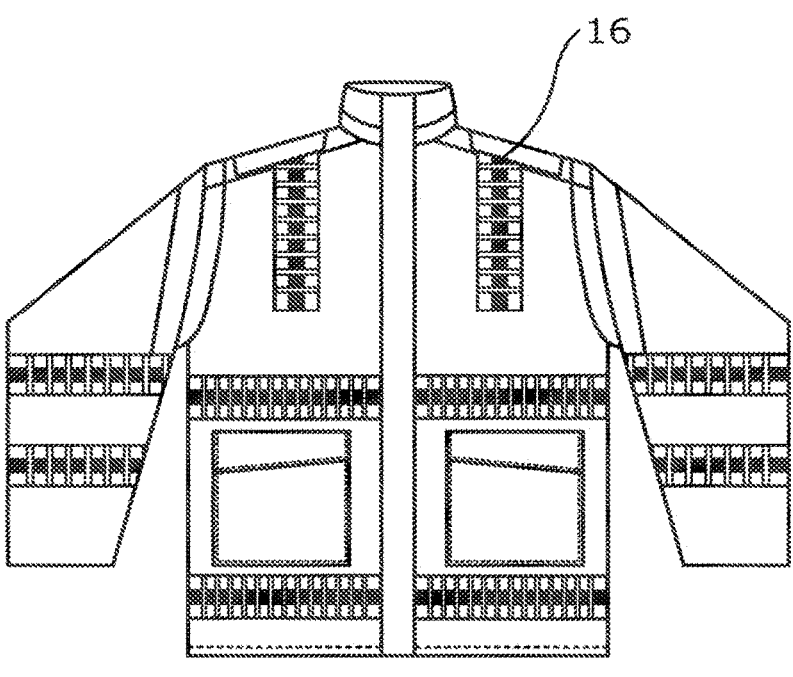
FIGS. 7c and 7d are front and rear views of a Fire Fighter jacket including areas of tape as shown in FIG. 5 and, FIG. 8 is an image showing the effect of the retroreflective and fluorescent sheet thickness on glow performance.
Figure 7D:
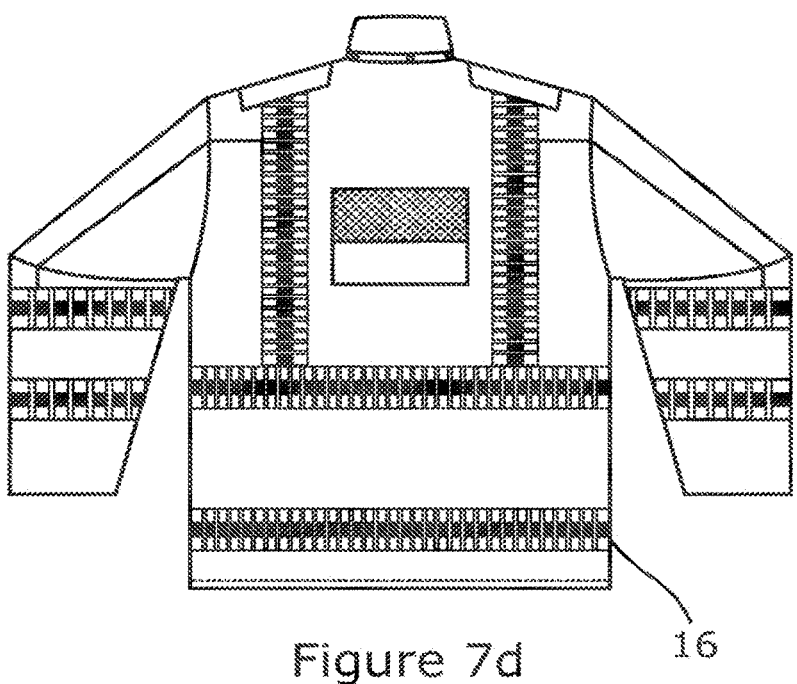

Although the retroreflective and fluorescent regions 17, 18 are in the form of stripes in FIG. 5, it will be appreciated that they could be made in any suitable shape or size and angled in any direction, for example as shown in FIGS. 6a-6i The retroreflective and fluorescent regions 17, 18 may take the form of chevrons as best shown in FIG. 6i or other preferred designs as shown in FIGS. 6a-6h. Finally, if it is desired to produce a transfer tape, the side of the substrate opposite that covered by the retroreflective and fluorescent sheet 16 may also be coated with a heat-sensitive adhesive with the appropriate properties as previously mentioned.

The retroreflective and fluorescent sheet 16 comprises a pre-determined pattern of openings in the retroreflective and fluorescent materials for exposing the underlying phosphorescent coating 15 once the retroreflective and fluorescent sheet 16 has been applied to the coated substrate. As best shown in FIGS. 5 and 6a-6i, the pre-determined pattern comprises a series of line openings which individually or together extend partly across the width of the retroreflective and fluorescent sheet 16.

In one example (FIG. 6h), the retroreflective and fluorescent sheet has a width of 50.08 mm. This the retroreflective and fluorescent sheet has a line opening (48 mm) that intersects and extends from a first longitudinal edge of the retroreflective and fluorescent sheet 16 and terminates before reaching the opposite (second) longitudinal edge of the retroreflective and fluorescent sheet 16. FIG. 6h additionally shows that an adjacent line opening (48 mm) intersects and extends from the second longitudinal edge towards the first longitudinal edge and that it terminates before intersecting the first longitudinal edge of the retroreflective and fluorescent sheet 16. The pattern is repeated along the length of the retroreflective and fluorescent sheet 16, or at least a part thereof. Each line opening has a width of 1 mm and the distance between adjacent line openings is 4 mm. The line openings in this embodiment are angled substantially perpendicular to the longitudinal axis of the retroreflective and fluorescent sheet 16, but in other embodiments they could be angled, e.g., at 45 degrees relative to the horizontal axis of the retroreflective and fluorescent sheet 16. In a related example, the retroreflective and fluorescent sheet has a width of 75 mm. Each line opening has a length of 73 mm and a width of 1 mm. The distance between adjacent line openings is 4 mm.

In another example (FIG. 6g), the retroreflective and fluorescent sheet has a width of 50.08 mm and the line openings are substantially L-shaped. Each L-shaped opening comprises a first section (45 mm) which extends substantially perpendicular to the longitudinal axis of the retroreflective and fluorescent sheet 16 and a second section (4 mm) which extends substantially parallel to said longitudinal axis. As best shown in FIG. 6g the first section of one L-shaped line opening intersects and extends from a first longitudinal edge of the retroreflective and fluorescent sheet 16 towards an opposite (second) longitudinal edge and is arranged so that the second section is oriented upwards. FIG. 6g, additionally shows that an adjacent L-shaped line opening intersects and extends from the second longitudinal edge towards the first longitudinal edge and that it is arranged so that the second section is oriented downwards. The pattern is repeated along the length of the retroreflective and fluorescent sheet, or at least a part thereof. The L-shaped line openings in this example are 1 mm and the distance between adjacent L-shaped openings is 1 mm. In another example, the L-shaped line openings are 1 mm wide and the distance between adjacent L-shaped openings is 3 mm. In a related example, the retroreflective and fluorescent sheet has a width of 75 mm. The first section of each L-shaped opening is 67.5 mm in length and the second section is 4 mm in length. The L-shaped line openings in this example are 1 mm and the distance between adjacent L-shaped openings is 1 mm or 3 mm.

In other examples, one or more of the line openings may extend substantially parallel the longitudinal edges of the retroreflective and fluorescent sheet. For instance, in FIGS. 6a-6g, line openings are located adjacent to each longitudinal edge of the retroreflective and fluorescent sheet and extend partly along each longitudinal edge. As best shown in FIG. 6a, additional line openings may be located in a central area of the fluorescent region 18 and extend substantially parallel to the longitudinal axis of the retroreflective and fluorescent sheet 16. However, in other examples, line openings which extend substantially parallel to the longitudinal edges of the retroreflective and fluorescent sheet 16 may be provided in the retroreflective region 17 or at the border between the retroreflective region 17 and the fluorescent regions 18 as best shown in FIGS. 6a-6c. The pre-determined patterns shown in FIGS. 6a-6g also include a line opening in the retroreflective region 17 which extends perpendicular to the longitudinal axis of the retroreflective and fluorescent sheet 16. This line opening is joined at either end with angled line openings which extend from the retroreflective region into the fluorescent regions.

Firefighting turnout gear includes fire helmets, jackets, trousers, gloves, boots and breathing apparatus. The firefighting jackets 19 as shown in FIGS. 7a-7d and trousers (not shown) typically comprise a two-layer fabric designed to repel heat and wick away any moisture that gets inside. The cuter layer comprises an abrasion, flame and heat resistant material such as aramid, e.g. NOMEX® or KEVLAR® or a blend thereof. As shown in FIGS. 7a-7d, the combined phosphorescent, retroreflective and fluorescent articles are secured to the outer layer of the jacket 19 in pre-determined regions across the chest, back, stomach and sleeve regions of the jacket. In these examples, the combined phosphorescent, retroreflective and fluorescent articles are stitched to the jacket 19, although as discussed above, they could also be secured to the jacket using a suitable adhesive. Although not shown, it will be appreciated that the combined phosphorescent, retroreflective and fluorescent article can also be secured to other firefighting turn out garments such as a firefighter's over-trousers.

It has been found that the articles produced in accordance with the above method and which comprise any of the line patterns shown in FIGS. 5-6i comply with the following European standards: EN ISO 20471:2013/A1:2016; EN ISO 14116:2015; EN ISO 15614:2007); EN ISO 11611:2015; EN ISO 1149-5:2018 and EN 469:2005+A1:2006. It has additionally been found that articles produced according to the above method comply with the following European, US and Australian standards for fire resistance: ENISO 15384: 2020+EN11612:2015; NFPA 1971 (structural); NFPA 1977 (wildland), NFPA 2112 (flash fire) and NFPA 70E (Arc), AS/NZ 4824 (Wildland), ASNZ 4967 (Structural) and AS/NZ 1906.4 (Reflective).

Figure 8:
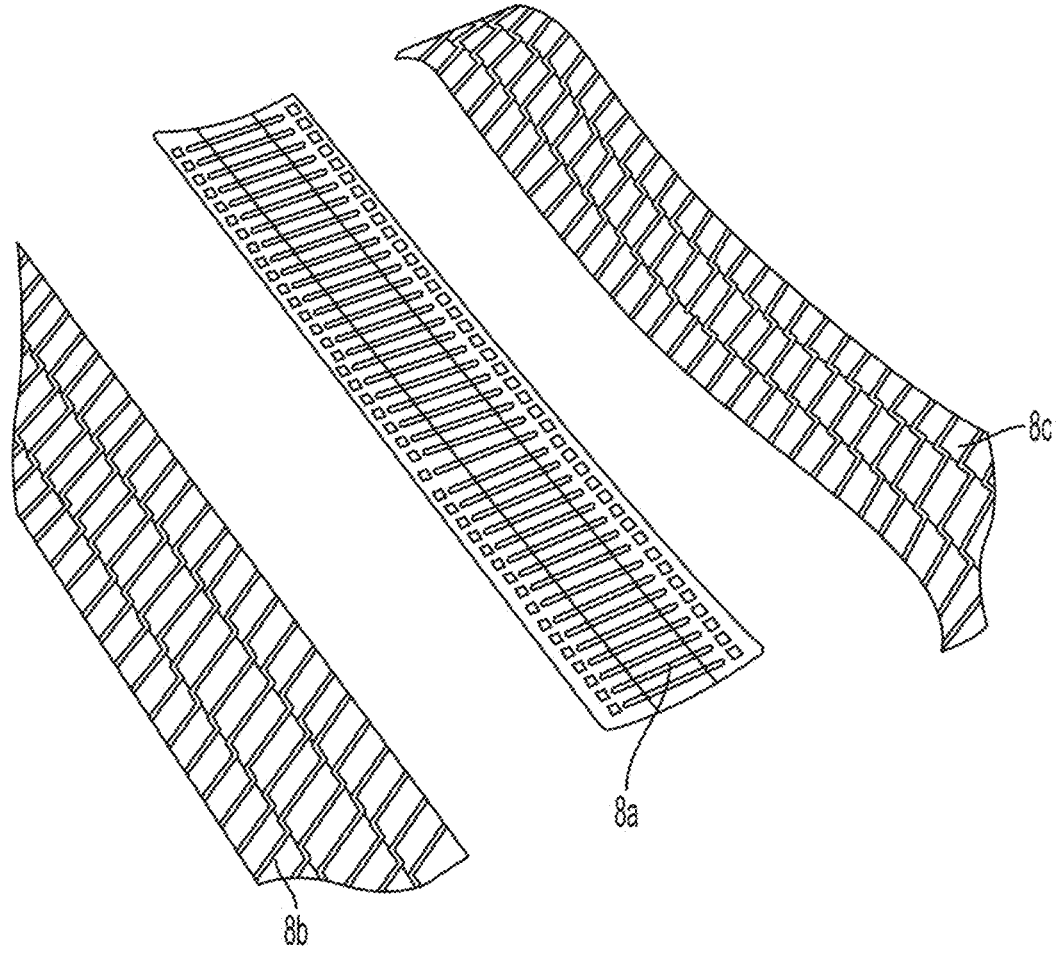

FIGS. 8a-8c shows the effect of the retroreflective and fluorescent sheet thickness on glow performance. In particular, the article shown in FIG. 8a is provided with a retroreflective and fluorescent sheet 16 having a thickness of 20 μm, whereas the articles shown in FIGS. 8b and 8c respectively have a retroreflective and fluorescent sheet 16 thickness of 25 μm and 30 μm. It can be seen that the glow performance of the article shown in FIG. 8a having a retroreflective and fluorescent sheet 16 thickness of 20 μm is greater than the glow performance of the articles shown in FIGS. 8b and 8c where the retroreflective and fluorescent sheets 16 are thicker.

There is no standard for measuring glow performance for workwear and therefore glow performance can only be determined using the standards that are typically used for safety exit signs. In the current study, glow performance of the phosphorescent layer without a retroreflective and fluorescent sheet was measured using ISO 17398:2004 Safety colours and safety signs. Three phosphorescent samples were kept under dark conditions for at least 48 hours prior to excitation. The samples were exposed during a time of 5 minutes at 1000 lux from an unfiltered 150 W Xenon lamp. The illuminance at the measuring plane was measured with a lux-meter. After 5 minutes the xenon lamp was turned off and a luminance meter measuring spot of about 45 mm was used. Measurements are taken after 2 mins, 10 mins, 30 mins and 60 mins after the light is extinguished. An average of the measurements obtained from the three samples is calculated and compared against Table 1 to determine the performance rating against the specification.

Minimum Luminance (mcd/m2)

TABLE 1

| Sub-classification | At decay time 2 min | At decay time 10 min | At decay time 30 min | At decay time 60 min |
|---|---|---|---|---|
| A | 108 | 23 | 7 | 3 |
| B | 210 | 50 | 15 | 7 |
| C | 690 | 140 | 45 | 20 |
| D | 1,100 | 260 | 85 | 35 |
| E | 2200 | 520 | 170 | 70 |

As best shown in in Table 2, the article exhibited a luminescence of 2090 mcd/m2 after 2 minutes meaning the article meets the D standard.

TABLE 2

| Sample | Luminance (mcd/m2) | | | | | | Decay time (min) |
|---|---|---|---|---|---|---|---|
| | 2 min | 10 min | 30 min | 60 min | 120 min | 480 min* | |
| VizLite DT | 2090 | 416 | 121 | 52.5 | 22.1 | 3.56 | 2780 |

In accordance with DIN 67510-1:2009 the decay time of the sample was measured, i.e. the time for the luminescence to reach 0.3 mcd/m2. This involved exposing a sample for 5 minutes at 1000 lux from an unfiltered 150 W Xenon lamp. The illuminance at the measuring plane was measured with a lux-meter, Hagner, Model S4. After 5 minutes the xenon lamp was turned off and a luminance meter (Photo Research Model 1980A) connected to a computer was used to record the luminance every minute for 16 hours, corresponding to at least 10% of the decay time. A measuring spot of 45 mm was used. The sample was kept under dark conditions for at least 48 h prior to excitation. According to section 4.5 of DIN 67510-1, a logarithmic parabolic extrapolation of the results was used to estimate the decay time, which is defined as the time for the luminance to reach 0.3 mcd/m2. As shown in Table 2, once the product has been charged it will continue to glow for up to 48 hours.

The one or more embodiments are described above by way of example only. Many variations are possible without departing from the scope of protection afforded by the appended claims.

The invention claimed is:

1. A combined phosphorescent, retroreflective and fluorescent article comprising a substrate, a phosphorescent layer on at least one side of the substrate and a retroreflective and fluorescent sheet provided over the phosphorescent layer, wherein the phosphorescent layer is formed from multiple phosphorescent sub-layers and wherein the retroreflective and fluorescent sheet is configured so that at least 5% of visible area of said one side is phosphorescent.

2. An article according to claim 1, wherein the retroreflective and fluorescent sheet comprises a plurality of openings for exposing the underlying phosphorescent layer.

3. An article according to claim 2, wherein the openings are in the form of lines which partially extend across the width of the retroreflective and fluorescent sheet.

4. An article according to claim 3, wherein the line openings extend from one longitudinal edge of the retroreflective and fluorescent sheet and terminate before reaching the opposite longitudinal edge of the retroreflective and fluorescent sheet.

5. An article according to claim 2, wherein the retroreflective and fluorescent sheet comprises straight line openings, L-shaped line openings or line openings in the form of a chevron.

6. An article according to claim 2, wherein the openings are in the form of lines which extend across the full width of the retroreflective and fluorescent sheet.

7. An article according to claim 2, wherein the line openings have a width of 0.2 mm to 1.5 mm.

8. An article according to claim 2, wherein the line openings are spaced 1 mm to 15 mm apart.

9. An article according to claim 2, wherein the retroreflective and fluorescent sheet comprises an open area of 15-38% per cm$^2$.

10. An article according to claim 1, wherein the phosphorescent layer is visible along one longitudinal edge of the retroreflective and fluorescent sheet to define a single phosphorescent border or wherein the phosphorescent layer is visible along each longitudinal edge of the retroreflective and fluorescent sheet to define two phosphorescent borders.

11. An article according to claim 10, wherein the width of the phosphorescent borders is 1-10 mm.

12. An article according to claim 1, wherein the retroreflective and fluorescent sheet has a thickness of 10 to 35 μm.

13. An article according to claim 1, wherein a top coat is provided over the phosphorescent layer.

14. An article according to claim 1, wherein the phosphorescent layer is provided in stripes and the retroreflective and fluorescent sheet is provided between the phosphorescent stripes.

15. A method according to claim 14, wherein the predetermined pattern of openings is in the form of one or more lines that extend partially or fully across the width of a region covered by the retroreflective and fluorescent materials or the width of the retroreflective and fluorescent sheet.

16. An article according to claim 1, wherein the article has a luminescence of 690 to 2200 (mcd/m$^2$) after a decay time of two minutes.

17. A method of manufacturing the combined phosphorescent, retroreflective and fluorescent article according to claim 1, the method comprising the steps of:

I. Coating at least part of one side of a substrate with a mixture of an adhesive and a phosphorescent pigment;

II. curing the coating; and

III. applying retroreflective and fluorescent materials over the phosphorescent layer, wherein the phosphorescent layer is formed from multiple phosphorescent sublayers and at least 5% of visible area of said one side is phosphorescent.

18. A method according to claim 17, wherein a predetermined pattern of openings is formed in the retroreflective and fluorescent materials or in a retroreflective and fluorescent sheet for exposing the underlying phosphorescent layer.

19. A garment or object comprising the article according to claim 1.

20. A garment according to claim 19, wherein the garment is a firefighter turn out garment.

* * * * *